United States Patent [19]

Covitt

[11] 4,168,470

[45] Sep. 18, 1979

[54] TWO-BIT A/D CONVERSION APPARATUS WITHOUT A SIGNAL DERIVED AUTOMATIC GAIN CONTROL

[75] Inventor: Arthur L. Covitt, Sudbury, Mass.

[73] Assignee: The United States of America as represented by the Secretary of the Air Force, Washington, D.C.

[21] Appl. No.: 768,812

[22] Filed: Feb. 15, 1977

[51] Int. Cl.² ............ H03D 3/00; H03K 13/02; H04B 1/06
[52] U.S. Cl. .................... 325/344; 329/112; 340/347 AD; 340/347 M
[58] Field of Search .... 340/347 M, 347 SY, 347 AD; 329/131, 112, 124; 328/171, 173; 325/414, 400, 344–349; 331/12

[56] References Cited

U.S. PATENT DOCUMENTS

| | | | |
|---|---|---|---|
| 3,181,156 | 4/1965 | Ward | 325/349 X |
| 3,611,350 | 10/1971 | Leibowitz et al. | 340/347 AD |
| 3,735,391 | 5/1973 | Games et al. | 340/347 SY |
| 3,983,499 | 9/1976 | Tan | 331/12 X |
| 4,013,965 | 5/1977 | Scharfe | 325/320 |
| 4,062,005 | 12/1977 | Freed et al. | 340/177 R X |

OTHER PUBLICATIONS

Landee, et al., Electronic Designers' Handbook, McGraw-Hill Book Co., 1957, pp. 5-37 to 5-39.
The Engineering Staff of Analog Devices, Inc., Analog-Digital Conversion Handbook, 6/1972, pp. I-26 to I-31.

*Primary Examiner*—Thomas J. Sloyan
*Attorney, Agent, or Firm*—Joseph E. Rusz; William Stepanishen

[57] ABSTRACT

A two-bit analog to digital conversion apparatus for direct and instantaneous generation of digital signals which are independent of the absolute amplitude of the input signal envelope.

5 Claims, 1 Drawing Figure

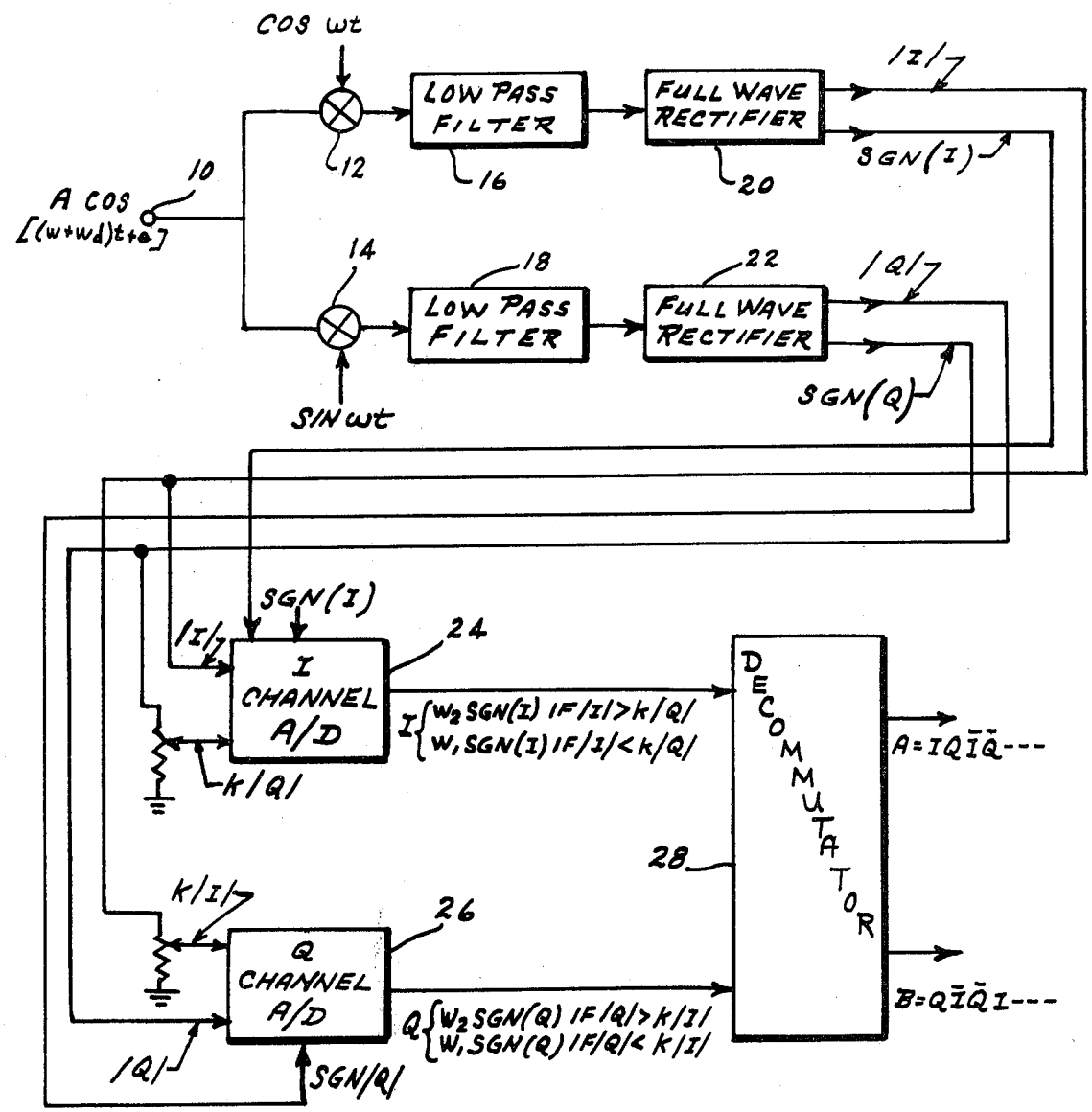

TWO-BIT A/D CONVERSION APPARATUS WITHOUT A SIGNAL DERIVED AUTOMATIC GAIN CONTROL

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an analog to digital converter apparatus, and in particular to a two-bit analog to digital conversion apparatus without AGC.

An analog to digital converter apparatus is a device for converting information in the form of continuously varying signals into digital numbers which represent the magnitude of the signal at the time the conversion is made. In the most common applications, the converter is used to transform information into a form suitable for processing on a digital computer. This implies that analog information must be quantized into discrete voltage signals having an assigned logical 0 or 1 level (for example, ground, or +5 volts). The raw information frequently is taken from measurements of temperatures, forces, shaft rotation, or other continuous quantities and is first represented by an analog electrical signal, which is then converted to digital.

In the prior art, there are many techniques which can be used for analog-to-digital conversion. They range from simple-voltage-level comparators to complete close-loop conversion for high accuracy. The two techniques most commonly used are ramp counting and successive approximation. The counting method is a simple method but relatively slow for high-speed conversion systems. The analog signal to be converted is applied to one input terminal of a high-resolution comparator. The other input terminal to the comparator is connected to the output of a ramp generator. At the start of the ramp a binary counter is enabled and thereupon begins counting the master-clock pulses. When the ramp reaches the same level as the analog input signal, the counter is instructed to stop counting by the output of the comparator. The binary value in the counter is equivalent to the analog value. The total number of counts in one complete period of the ramp is equal to the number of quantization levels. The successive approximation has inherent in its principle of operation, a minimum number of switching networks to determine the analog value.

SUMMARY

The present invention utilizes a receiver demodulator to provide an accurate analog to digital conversion of a phase modulated carrier without a signal derived automatic gain control (AGC). The two-bit A/D conversion apparatus utilizes a pair of rectifier units to resolve the carrier baseband residue into a pair of quadrature channel voltages. The quadrature channel voltages are continuously applied as control signals to the A/D converters to select the instantaneously appropriate binary output signal from each channel. For any signal-to-noise ratio input exceeding an acceptable minimum, the output is independent of input signal amplitude and therefore the A/D converter performs a function equivalent to an ideal instantaneous automatic gain control (IAGC). The digitized outputs are sequentially sampled in a decommutator unit and applied respectively to a pair of digital matched filters for digital signal processing appropriate to the particular type of phase modulation used in the present embodiment.

It is one object of the present invention, therefore, to provide an improved two-bit A/D conversion apparatus which does not require a signal controlled AGC.

It is another object of the invention to provide an improved two-bit A/D conversion apparatus for instantaneously generating digital outputs independent of input signal amplitude.

It is yet another object of the invention to provide an improved two-bit A/D conversion apparatus having improved performance characteristics over known similar circuits.

These and other advantages, objects and features of the invention will become more apparant from the following description taken in conjunction with the illustrative embodiment in the accompanying drawings wherein there is shown a block diagram of the two-bit conversion apparatus.

DESCRIPTION OF THE PREFERRED EMBODIMENT

Referring now to the FIGURE, there is shown a block diagram of the two-bit A/D conversion apparatus receiving the output signal from a receiver at point 10. The receiver output signal is respectively processed by demod units 12, 14 to extract the carrier which is filtered respectively in low pass filter units 16, 18. The quadrature channel voltages are rectified in rectifier units 20, 22 prior to being applied to the channel A/D converter units 24, 26. The digitized outputs from the channel A/D converter units 24, 26 are applied to appropriate digital signal processing equipment. The FIGURE illustrates the use of a decommutator, 28, for sequential sampling of the A/D converter outputs and the generation of binary streams at a periodic rate suitable for digital matched filter detection of the input signal. The decommutator is utilized only when the particular variant of signal phase modulation employed requires sequential sampling in the demodulation process.

The present two-bit A/D conversion apparatus operates in accordance with the following general principles, equations and constraints. The first step in the signal recovery process is to extract the carrier and resolve the baseband residue into quadrature components. The analog voltages in the quadrature channels may then be represented as:

$$I = A(t) \cos \phi(t)$$

and $$Q = A(t) \sin \phi(t)$$

The quadrature channel voltages are periodically sampled and digitized in two-bit A/D converters. In principle, the converter compares the input to a voltage threshold $T$ and outputs one of four digital values $\pm W_1$ or $\pm W_2$. If the input $V$ is:

| | | |
|---|---|---|
| $V \leq -T$ | output $= -W_2$ | (a) |
| $-T < V \leq 0$ | output $= -W_1$ | (b) |
| $0 > V \leq T$ | output $= +W_1$ | (c) |
| $V > T$ | output $= +W_2$ | (d) |

The outputs from the A/D converters should be independent of the signal level input at the receiver. If a fixed threshold T is used, the receiver gain must be made inversely proportional to signal amplitude, such that the receiver gain, $G = C[A(t)]^{-1}$. A circuit which modifies the receiver gain at any instant to maintain a constant envelope output independent of the input envelope amplitude is called an instantaneous automatic gain control circuit (IAGC). With IAGC, the value $A(t)$ may be normalized to unity such that the quadrature voltage $\cos \phi(t)$ and $\sin \phi (t)$ vary between limits of $\pm 1$ and with a fixed threshold T set in the range $0 < T < 1$.

It has been observed that if $A(t) = 1$ and a threshold T is set at 0.707, the outputs of the two quadrature channel A/D converters will always differ.

For an arbitrary sampling time t if $|\cos \phi (t)| > 0.707$, then $|\sin \phi (t)| < 0.707$ or if $|\cos \phi (t)| < 0.707$, then $|\sin \phi (t)| > 0.707$ The larger of the two input magnitudes will produce an output $|W_2|$ while the smaller will result in $|W_1|$ from the converter. It follows, therefore, that any circuit which forces the converter outputs to differ at every sampling interval is equivalent to an ideal IAGC with the threshold T set at 0.707.

Full wave rectifiers will determine $|I|$ and $|Q|$ and in addition can sense the algebraic signs of I and Q from the direction of current flow. In the A/D converters the magnitudes $|I|$ and $|Q|$ are compared. If $|I| > |Q|$ the weight $|W_2|$ is assigned to the $\hat{I}$ output and $|W_1|$ to the $\hat{Q}$ output. The weights $|W_n|$ multiplied by the corresponding signs of I or Q are the derived outputs. This apparatus is independent of $A(t)$ and does not require any gain adjustment provided that the receiver has adequate dynamic range.

However, the two-bit conversion apparatus shown in the FIGURE utilizes a more general implementation by considering the quantities $|I| - k|Q|$ and $|Q| - k|I|$ instead of comparing $|I|$ and $|Q|$. In the I channel A/D converter, the output is:

$|W_2|$ sign (I) if $|I| - k|Q| > 0$ and $|W_1|$ sign (I) if $|I| - k|Q| < 0$ similarly in the Q channel the output is $|W_2|$ sign (Q) when $|Q| - k|I| > 0$ and otherwise $|W_1|$ sign (Q).

The factor k is related to the threshold T as follows:

(1) The normalized I channel voltage crosses a threshold $T = \cos \theta$ at some phase angle $\theta$ where $\cos \theta - k \sin \theta = 0$.

$$\text{Since } \sin \theta = \sqrt{1 - \cos^2 \theta} \text{ and } T = \cos \theta \qquad (2)$$

$$T - k\sqrt{1 - T^2} = 0$$

$$k = \sqrt{1 - T^2}$$

(3) Similarly the Q channel voltage will cross a threshold $T = \sin \theta$ where $\sin \theta - k \cos \theta = 0$.

Digitized outputs $\hat{I}$ and $\hat{Q}$ are sequentially sampled in a decommutator and then inputted to digital matched filters.

For applications where A/D conversion with more than two-bit quantization is desired, the same basic circuit can be used. The FIGURE may be modified to allow n level quantization by comparing $|I|$ with $K_j |Q|$ for all values of J ($1 \leq j \leq n - 1$) and corresponding in the orthogonal channel (i.e., $|Q|$ with $k_j |I|$). Thus, there has been shown and described a two-bit A/D conversion apparatus which provides a means for an A/D conversion without automatic gain control in a receiver.

Although the invention has been described with reference to a particular embodiment, it will be understood to those skilled in the art that the invention is capable of a variety of alternative embodiments within the spirit and scope of the appended claims.

What is claimed is:

1. A two-bit A/D conversion apparatus comprising in combination:

demodulator means receiving a receiver signal, said receiver signal being a constant amplitude phase modulated signal, said receiver signal being demodulated and resolved into an in-phase signal and a quadrature signal, said in-phase signal being detected to provide a first voltage signal and a sign I signal, said quadrature signal being detected to provide a second voltage signal and a sign Q signal, said sign I signal representing the algebraic sign of said in-phase signal, said sign O signal representing the algebraic sign of said quadrature signal, said in-phase signal and said quadrature signal having a phase difference of 90°, said first and second voltage signals being the absolute values of said in-phase and said quadrature signals respectively, and, analog to digital conversion means receiving said first and second voltage signals, and said sign I and sign Q signals, said analog to digital conversion means continuously sampling said first and second voltage signals, said analog to digital conversion means utilizing said sign I and sign Q signal as a weighting factor for the conversion of said first and second voltage signals, said analog to digital conversion means having a first and second channel, said first channel receiving said first voltage signal and said sign I signal, said second channel receiving said second voltage signal and said sign Q signal, said first channel receiving a signal, $k|Q|$ which is derived from said second voltage signal and k is a constant factor of proportionality, said second channel receiving a signal $k|I|$ which is derived from said first voltage signal and k is a constant factor of proportionality, said first voltage signal providing the quantity $|I|$, said first channel comparing the quantity $|I| - k|Q|$ to provide a weighting factor, said first channel providing a first weighting factor when $|I| - k|Q| > 0$ and a second weighting factor when $|I| - k|Q| < 0$, said, second voltage signal providing the quantity $|Q|$, said second channel comparing the $|Q| - k|I|$ to provide a weighting factor, said second channel providing a first weighting factor when $|Q| - k|I| > 0$ and a second weighting factor when $|Q| - k|I| < 0$, said analog to digital conversion means digitizing said first and second voltage signals respectively to provide a first and second digital output signal, said first digital output signal comprises the weighting factor from said first channel times said sign I signal, said second digital output signal comprises the weighting factor from said second channel times said sign Q signal whereby the two-bit A/D conversion is achieved without automatic gain control.

2. A two-bit A/D conversion apparatus as described in claim 1 further including a means for decommutating said first and second digital output signals, said decommutating means sequentially sampling said first and second digital output signals, said decommutating means providing a first digital bit output and a second digital bit output.

3. A two-bit A/D conversion apparatus as described in claim 1 wherein said demodulating means comprises in combination:
  a first and second demodulator unit to demodulate and separate said receiver signal into said in-phase and quadrature signal respectively,
  a first and second low pass filter respectively connected to said first and second demodulator unit, said first and second low pass filter removing the higher harmonics from said in-phase and quadrature signal respectively, and
  a first and second full wave rectifier connected to said first and second low-pass filter to receive and rectify respectively said in-phase and quadrature signal, said in-phase signal being detected to provide said first voltage signal and said sign I signal, said quadrature signal being detected to provide said second voltage signal and said sign O signal.

4. A two-bit conversion apparatus as described in claim 1 wherein said analog to digital conversion means comprises in combination:
  a first and second analog to digital converter channel to receive said first and second voltage signals respectively, said first and second analog to digital converter channel respectively comparing said first and second voltage signals to a voltage threshold, said first and second analog to digital converter channel providing a first and second digital output signal.

5. A two-bit conversion apparatus as described in claim 4 wherein said first and second analog to digital converter channel unit each compares its voltage signal with a voltage threshold, T in accordance with the following table;

| | | |
|---|---|---|
| $V \leq -T$ | output $= -W_2$ | (a) |
| $-T < V \leq O$ | output $= -W_1$ | (b) |
| $O > V \leq T$ | output $= +W_1$ | (c) |
| $V > T$ | output $= +W_2$ | (d) | where $\pm W_1$, and $\pm W_2$ are predetermined digital values respectively.

* * * * *